United States Patent [19]

Ramsey

[11] Patent Number: 5,449,748
[45] Date of Patent: Sep. 12, 1995

[54] PREPARATION OF ANHYDROPOLYAMINO ACIDS AT TEMPERATURES OF 350° C. OR ABOVE

[75] Inventor: Skippy H. Ramsey, Fenton, Mo.

[73] Assignee: Monsanto Company, St. Louis, Mo.

[21] Appl. No.: 364,633

[22] Filed: Dec. 27, 1994

[51] Int. Cl.$^6$ .............................................. C08G 69/10
[52] U.S. Cl. .................... 530/300; 528/310; 528/328; 530/324
[58] Field of Search ............... 530/300, 324; 528/310, 528/328

[56] References Cited

U.S. PATENT DOCUMENTS

| | | |
|---|---|---|
| 3,846,380 | 11/1974 | Fujimoto et al. . |
| 4,333,844 | 6/1982 | Duggleby et al. . |
| 4,363,797 | 12/1982 | Jacquet et al. . |
| 4,407,722 | 10/1983 | Davies et al. . |
| 4,428,749 | 1/1984 | Morris . |
| 4,971,724 | 11/1990 | Kalota et al. . |
| 5,057,597 | 10/1991 | Koskan . |
| 5,219,986 | 6/1993 | Cassata . |
| 5,221,733 | 6/1993 | Koskan et al. . |
| 5,288,783 | 2/1994 | Wood . |
| 5,292,864 | 3/1994 | Wood et al. ............... 528/328 X |
| 5,315,010 | 5/1994 | Koskan et al. . |
| 5,319,145 | 6/1994 | Paik et al. . |
| 5,393,868 | 2/1995 | Freeman et al. ............... 530/328 X |

FOREIGN PATENT DOCUMENTS

14775/92 10/1992 Australia .
0633281A1 6/1994 European Pat. Off. .

OTHER PUBLICATIONS

"Temperature Effect on the Molecular Weight and the Optical Purity of Anhydropolyaspartic Acid Prepared by Thermal Polycondensation", *Bulletin of the Chemical Society of Japan*, vol. 51(5), 1555-1556 (1978), Kokufuta et al.
*J.O.C.S.*, vol. 26, 1084-1091 (1961), J. Kovacs et al
"Water-Soluble Polyamides as Potential Drug Carriers", *Die Angewandte Makronmolekulare Chemie* 192 35-50 (1991), Neuse et al.
National Council on Research and Development NRCD 8-76, Seawater Desalination 150-157 (1977), Sarig et al.

*Primary Examiner*—Howard E. Schain
*Attorney, Agent, or Firm*—R. Loyer

[57] ABSTRACT

There is disclosed a process for preparing polysuccinimide by thermal condensation of L-aspartic acid to produce polysuccinimide wherein the L-aspartic acid is exposed to an atmosphere in excess of about 350° C. and to a temperature in the range of from about 350° C. to about 400° C. for a period of time of from about 6 to about 15 minutes. Under such conditions, at least about 90% conversion of the L-aspartic acid is provided. The polysuccinimide may be hydrolysed to provide polyaspartic acid by conventional hydrolysis under basic conditions.

12 Claims, No Drawings

PREPARATION OF ANHYDROPOLYAMINO ACIDS AT TEMPERATURES OF 350° C. OR ABOVE

This invention relates to a process for preparing anhydropolyamino acids and the hydrolysis thereof to form polyamino acids. More particularly this invention relates to novel processes for continuously preparing polysuccinimide which is readily hydrolyzed to polyaspartic acid.

BACKGROUND OF THE INVENTION

The thermal condensation of alpha amino acids to form polymers with loss of water has been known for many years. Early interest in such processes related to theories for formation of prebiotic polypeptides. For the purpose of testing such theories laboratory experiments used powdered L-aspartic acid, usually packed in the bottom of a flask which was then heated below the melting point of the acid. Such reactions were slow and took place over many hours. One such example is reported by Kokufuta et al. in Bulletin of the Chemical Society of Japan Vol. 51 (5) 1555–1556 (1978) "Temperature Effect on the Molecular Weight and the Optical Purity of Anhydropolyaspartic Acid Prepared by Thermal Polycondensation." The structure of anhydropolyaspartic acid has been thoroughly investigated such as by J. Kovacs et al. in J.O.C.S. Vol. 26 1084–1091 (1961).

In recent years many utilities have been suggested for anhydropolyamino acid. Such polyamides have been suggested as potential drug carriers by Neuse et al. in Die Angewandte Makronmolekulare Chemie 192 35–50 (1991) "Watersoluble polyamides as potential drug carriers." They have also been tested as scale inhibitors with respect to natural sea water and calcium sulfate in particular by Sarig et al. as reported by the National Council on Research and Development (NRCD 8–76, Seawater Desalination 150–157 (1977). Polyaspartic acid has been well known for its ability to disperse solid particles in detergent formulations, having been mentioned as a dispersant in numerous patents, a few of which are U.S. Pat. Nos. 4,363,497; 4,333,844; 4,407,722 and 4,428,749. As a departure from the usual manner of utilizing polyaspartic acid in detergent formulations it is reported in Australian Patent A-14775/92 that the polyamide is added to the wash liquor which, upon hydrolysis in situ, is converted into a biodegradable polypeptide builder. Also, as described in U.S. Pat. No. 4,971,724 to Kalota et al., it has been discovered that compositions comprising polyamino acids such as aspartic acid, when ionized at alkaline pH, effectively inhibit corrosion of ferrous metals in the presence of aqueous medium. Various derivatives of polyamino acids have also been made wherein attributes have been supplied by groups attached to reactive sites on the molecule. One such example is disclosed in U.S. Pat. No. 3,846,380 to Fujimoro et al.

Because of the various impending potential utilities of anhydropolyamino acids, interest in processes for preparing such compounds in large volume, particularly polyaspartic acid, has increased. This interest has resulted in several recent patents being issued which are directed to fluid bed systems; in particular, U.S. Pat. No. 5,219,986 to Cassata. Other such patents are U.S. Pat. Nos. 5,057,597 and 5,221,733 to Koskan and Koskan et al. respectively. In industrial processes for the production of large volumes of product it is highly advantageous to employ a continuous process for obvious reasons.

Polysuccinimide, the precurser to poyaspartic acid or this salts is prepared by means recently described in U.S. Pat. No. 5,057,597, U.S. Pat. No. 5,315,010 and U.S. Pat. No. 5,319,145. In all of these patents dryers of various types are employed in the reaction to convert aspartic acid into polyaspartic acid by thermal condensation. Catalysts such as phosphoric acid may be employed to aid in reducing the amount of time required to condense the L-aspartic acid while subjected to heat and the removal of water in known manner. However, reaction time of at least 2 hours is required in the most efficient means available. There is needed a more efficient means for providing polysuccinimide whereby a shorter residence time in the reactor is needed for large scale production of the polymer.

BRIEF DESCRIPTION OF THE INVENTION

In accordance with this invention there has been discovered a process for producing anhydropolyamino acids (polysuccinimide) from L-asparatic acid in high yield in much less than two hours reaction time. More specifically the invention comprises a process for the production of anhydropolyamino acids in high yield by heating L-aspartic acid in an atmosphere maintained at a temperature in the range of from about 350° C. to about 400° C. The residence time of L-aspartic acid in such heated atmosphere has been found to be as little less than 10 minutes when employing an atmosphere temperature of about 400° C. Such reaction is highly surprising as it was formerly believed that such high reaction temperatures would provide conditions wherein significant amount of degradation of L-aspartic acid would occur. However, as will be shown below, the process of this invention provided an efficient, high yield means for the production of polysuccinimide as a precurser to polyaspartic acid or salts thereof.

DETAILED DESCRIPTION OF THE INVENTION

In accordance with this invention there is provided a process for the production of polysuccinimide by the thermal condensation of L-aspartic acid which comprises introducing L-aspartic acid into an atmosphere in the temperature range of from about 350° C. to about 400° C. or above for a period of time sufficient to convert at least 90 percent of the L-aspartic acid to polysuccinimide.

The L-aspartic may be premixed with any known catalyst such as phosphoric acid. One advantage of the present invention is that amounts of phosphoric acid which provides a non-flowable mass of L-aspartic acid may be employed in the process of this invention whereas such non-flowable mass could not be employed in prior art methods wherein various dryers are used. Although any suitable acid catalyst may be employed, the most popular catalyst is phosphoric acid because it is known to produce the least colored material. For example, an amount of phosphoric acid in the range of from about 15% and above, by weight, produces a non-flowable mass. Processes utilizing dryers as described in U.S. Pat. Nos. 5,315,010 and 5,319,145 require a flowable mass for efficient operation. However the process of this invention may employ such catalyst laden L-aspartic acid without deleterious effects.

A continuous process may be envisioned whereby the oven in which the high temperature atomsphere is produced is equipped with a movable floor. The rate of travel of the moving floor determines the residence time in the oven. As will be shown by the examples below, a short residence time provides conversion of the L-aspartic acid above 90% in a time of from about 6 to about 15 minutes.

The polysuccinimide thus produced may be hydrolyzed by conventional means under basic conditions to provide polyaspartic acid.

DESCRIPTION OF THE PREFERRED EMBODIMENTS

EXAMPLE 1

To an aluminum pan was added 10 g of L-aspartic acid in a thin layer. The pan was placed in a muffle furnace operated at 350° C. The calculated amount of water loss upon complete polymerization is 2.71 g. At one minute intervals the weight loss was determined as a measure of conversion of the L-aspartic to polysuccinimide. The results of these measurements appear below in Table I wherein reaction time is in minutes and weight loss is in grams.

TABLE I

| Reaction Time | Weight Loss | Percent conversion |
|---|---|---|
| 1 | 0.1864 | 6.88 |
| 2 | 0.4372 | 16.1 |
| 3 | 0.6323 | 23.3 |
| 4 | .7947 | 29.3 |
| 5 | 1.0523 | 38.8 |
| 6 | 1.2585 | 46.4 |
| 7 | 1.5611 | 57.6 |
| 8 | 1.7473 | 64.5 |
| 9 | 1.8872 | 69.6 |
| 10 | 2.0071 | 74.1 |
| 11 | 2.1625 | 79.8 |
| 12 | 2.2657 | 83.6 |
| 13 | 2.3738 | 87.6 |
| 14 | 2.4903 | 91.9 |
| 15 | 2.5647 | 94.6 |
| 16 | 2.6221 | 96.8 |
| 17 | 2.7042 | 99.8 |

From the above data it is seen that the polymerization was over 90% complete in less than 15 minutes. The product was light tan in color. The molecular weight was 9390.

EXAMPLE 2

The procedure of Example 1 was repeated with the exception that the furnace temperature was raised to 400° C. The results are reported below in Table II with the same units as noted in Example I.

TABLE II

| Reaction Time | Weight Loss | Percent Conversion |
|---|---|---|
| 1 | 0.4624 | 17.1 |
| 2 | 0.9147 | 33.9 |
| 3 | 1.3440 | 49.8 |
| 4 | 1.7986 | 66.6 |
| 5 | 2.1253 | 78.7 |
| 6 | 2.4972 | 92.5 |
| 7 | 2.7158 | 100.6 |

As indicated by the date in Table II, the polymerization was over 90 percent complete in about 6. minutes. The product color was light tan and slightly darker than in Example 1. The molecular weight of the polymer was 8380.

What is claimed is:

1. A process for preparing polysuccinimide by the thermal condensation of L-aspartic acid comprising subjecting the L-aspartic acid to an atmosphere at a temperature of above about 350° C. for a sufficient period of time to convert at least about 90 percent of the L-aspartic acid to polysuccinimide.

2. The process of claim 1 wherein the temperature is in the range of from about 350° C. to about 400° C.

3. The process of claim 2 wherein the period of time is in the range of from about 6 to about 15 minutes.

4. The process of claim 1 wherein the reaction is carried out in the presence of an acid catalyst for the condensation reaction.

5. The process claim 4 wherein the acid catalyst is phosphoric acid.

6. The process of claim 5 wherein the phosphoric acid in present in a concentration of at least about 15% based upon the weight of L-aspartic acid.

7. A process for preparing polysuccinimide by the thermal condensation of L-aspartic acid comprising subjecting the L-aspartic acid to an atmosphere at a temperature of above about 350° C. for a sufficient period of time to convert at least about 90 percent of the L-aspartic acid to polysuccinimide by means of an oven.

8. The process of claim 7 wherein the oven provides an atmosphere for said L-aspartic acid in the range of from about 350° C. to about 400° C.

9. The process of claim 7 wherein the reaction is carried out in the presence of an acid catalyst for the condensation reaction.

10. The process claim 9 wherein the acid catalyst is phosphoric acid.

11. The process of claim 10 wherein the phosphoric acid in present in a concentration of at least about 15% based upon the weight of L-aspartic acid.

12. The process of claim 7 wherein the reaction is continuous.

* * * * *